Oct. 27, 1964    YOICHI KAGAWA ET AL    3,154,782
SYSTEM FOR LENGTHENING THE EFFECTIVE RANGE OF RADAR
Filed Feb. 15, 1960
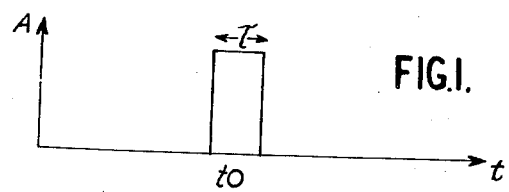
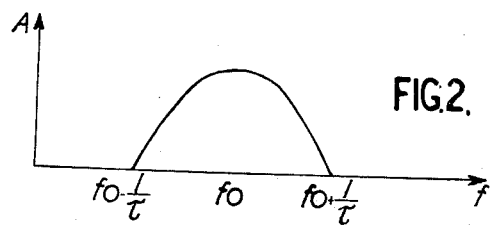
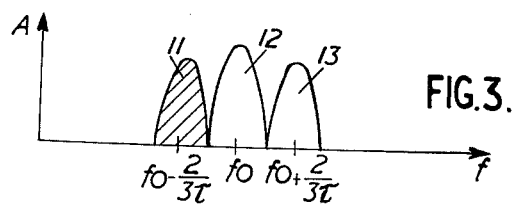
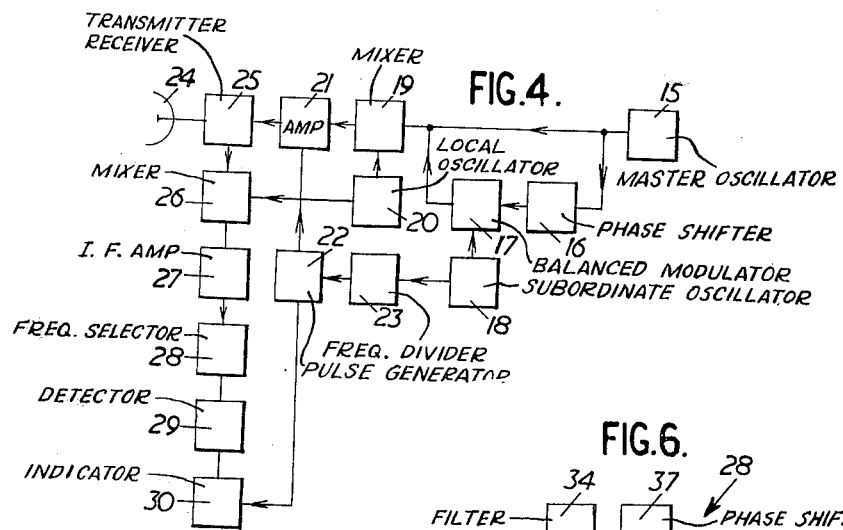
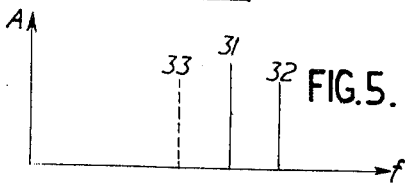
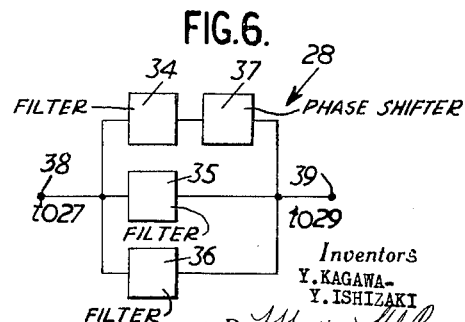
Inventors
Y. KAGAWA
Y. ISHIZAKI
By Matthew Russo
Attorney United States Patent Office 3,154,782
Patented Oct. 27, 1964

3,154,782
SYSTEM FOR LENGTHENING THE EFFECTIVE RANGE OF RADAR
Yoichi Kagawa and Yasutoshi Ishizaki, Tokyo, Japan, assignors to Nippon Electric Company, Limited, Tokyo, Japan, a corporation of Japan
Filed Feb. 15, 1960, Ser. No. 8,817
4 Claims. (Cl. 343—17.1)

This invention relates to radar system and more particularly to means in a radar system for modulating the transmitted wave or pulses in a particular manner and for receiving such modulated wave or pulses.

As is well-known, the effective range of radar equipment is not determined merely by the power transmitted from the transmitter section of the radar equipment but is determined by the product of the power transmitted from the transmitter section per unit time, namely, the mean power of the transmitter, and the integration time at the receiver section of the radar equipment. The integration time can not be made sufficiently long because of various reasons such that the target to be detected and traced by the radar will move during the integration time. In order to lengthen the effective range, it is therefore necessary to increase the mean power which, for example, in a pulse radar, in turn is the product of the peak power, the pulse width, and the pulse repetitive frequency. The peak power can not be made infinitely large, because it is subject to technical restrictions imposed on the transmitter. Also, the pulse repetitive frequency is restricted by the distance to the target. In order to increase the mean power and thereby to lengthen the effective range, it is therefore necessary to widen the pulse width of the transmitted pulse. Wide pulse width will, however, lower the accuracy of distance measurement by the radar equipment, insofar as the carrier wave is pulse-modulated merely in a conventional manner and then transmitted from the transmitter.

It is, therefore, an object of this invention to obtain means in a radar equipment for lengthening the effective range of the radar without lowering the accuracy of the distance measurement by the radar.

Another object of this invention is to obtain means in a radar equipment for increasing the width of the transmitted pulses, so that in an extreme case a continuous wave is transmitted from the transmitter section of the radar equipment, and for forming a series of discrete sharp pulses at the receiver section thereof.

Still another object of this invention is to obtain in the transmitter section of a radar equipment means for transmitting wide pulses or a continuous wave in which the carrier wave is modulated in a specific manner and in the receiver section thereof means for converting the received pulses or wave into a series of narrow pulses by means of a specific combination of circuit elements arranged in accordance with the manner in which the carrier wave is modulated.

According to an aspect of this invention, there is provided a radar system wherein the transmitted wave is modulated in such a manner that predetermined parts of the frequency spectrum of the transmitted wave are modulated in predetermined phase relationships relative to one another and wherein the received wave is separated by means of band-pass filters into parts corresponding to the predetermined parts of the frequency spectrum and the phases of the parts of the received wave are all made coincide by means of phase-shifting circuits to produce a series of pulses having large peak output.

By way of example, a preferred embodiment of this invention will be described hereunder with reference to the accompanying drawings in which:

FIG. 1 shows a waveform of a pulse transmitted from a radar transmitter;
FIG. 2 shows the spectral frequency distribution of the transmitted pulse used in a conventional radar system;
FIG. 3 shows an example of the frequency distribution of a transmitted pulse in a radar system according to this invention;
FIG. 4 is a block diagram of a radar equipment to which the means of this invention is applied;
FIG. 5 shows an example of frequency spectra of a combined oscillation which appears prior to pulse modulation of the carrier to be transmitted; and
FIG. 6 is a block diagram of a specific combination of circuit elements used in the receiver section of the radar equipment shown in FIG. 4.

Referring now to FIG. 1 of the drawings, there is shown a waveform of a pulse transmitted from a radar equipment, taking time $t$ and the amplitude A of the pulse as the abcissa and the ordinate, respectively. The time of occurrence of the pulse is denoted by $t_0$ and the width thereof by $\tau$. Such a pulse has a spectral frequency distribution as shown in FIG. 2, wherein the abcissa is the frequency $f$ and the ordinate the amplitude A and wherein the carrier frequency is $f_0$. It is of course that the waveform of the pulse shown in FIG. 1 is formed when all frequency components shown in FIG. 2 become in phase at the time $t_0$.

FIG. 3 illustrates an example of the frequency spectrum of the transmitting pulses as used in the system according to this invention. According to this example, it is assumed that the frequency spectrum is divided into three parts 11, 12 and 13 and at a time that the part 11 differs in phase from the other parts 12 and 13 by 180 degrees. Although the description will be made herein, for simplicity, of a case in which the spectrum is divided in three parts and one part differs in phase from the other parts by 180 degrees, it will be understood that according to the subject system the number of divisions is by no means restricted to three, nor the phase difference to 180 degrees. Referring to FIG. 3, the spectral parts do not overlap one another. This illustration, however, is to simplify the description.

The spectrum of FIG. 3 is obtained by amplitude-modulating at a proper time a continuous waveform having the spectrum as shown in FIG. 5 with pulses. In other words, the spectrum of FIG. 5 may be considered as that of an FM wave as will be mentioned afterwards. If this wave is pulse-amplitude-modulated, each of the line spectra shown in FIG. 5 is spread in frequency by an amount equal to the modulating pulse width with said line spectrum frequency as the center, with the result that the spectrum as shown in FIG. 3 is obtained. Referring to FIG. 5 numerals 31, 32 and 33 denote line spectra, of which line spectrum 33 alone is expressed by the dotted line to indicate the fact that the time line spectra 31 and 32 are in phase line spectrum 33 differs in phase from the others by 180 degrees.

That a wave having the spectrum as shown in FIG. 5 should be approximately an FM wave is expressly stated in "Frequency Analysis, Modulation and Noise" by Stanford Goldman, McGraw-Hill Book Company, Inc., 1948, page 150. This is because the oscillations of three voltages constituting the line spectra of FIG. 5 become in phase at any moment and a large arithmetic sum voltage is not produced. This will be recapitulated below. As will be mentioned below, the frequencies of the line spectra 31, 32 and 33 are respectively $f_0-2/(3\tau)$, $f_0$, and $f_0+2/(3\tau)$ and the line spectrum 33 differs in phase from the others by 180 degrees at time $t_0$, with the result that the voltage oscillations constituting these line spectra are expressed respectively as $\cos\{2\pi(f_0-2/(3\tau))(t-t_0)+\pi\}$, cos $\{2\pi f_0(t-t_0)\}$, and cos $\{2\pi(f_0+2/(3\tau))(t-t_0)\}$, provided the amplitudes are ignored.

Therefore the time $t_1$ at which line spectra 31 and 33 coincide in phase with each other is obtained from the equation:

$$2\pi\left(f_0-\frac{2}{3\tau}\right)(t1-t_0)+\pi=2\pi f_0(t1-50)+2\pi n.$$

Thus $$t1=\frac{3\tau}{4}(+n)+t_0$$

The time $t2$ at which line spectra 31 and 32 become in phase satisfies the following equation:

$$2\pi f_0(t2-t_0)+2\pi n=2\pi\left(f_0+\frac{2}{3\tau}\right)(t2-t_0).$$

Therefore we have $$t2=\frac{3\tau}{2}n+t_0$$

where $n$ is an integer.

Since the values of $t1$ and $t2$ are alternately spaced apart at $3\tau/4$ in succession, line spectra 31 and 32 will have a phase difference of 180 degrees at the moment at which the phases of line spectra 32 and 33 coincide with each other, in no case the three spectra coinciding in phase. By amplitude-modulating the wave form corresponding to the spectrum of FIG. 5 with pulses, each line spectrum is spread in accordance with the modulating pulse spectrum. Therefore the spectrum of FIG. 5 is considered as one which is obtained by amplitude-modulating the wave form having the spectrum of FIG. 5 with pulses. Therefore, in no case the three parts of the spectrum constituting the wave form having the spectrum of FIG. 5 become in phase at any moment to produce a large peak power and so is the wave form corresponding to the spectrum of FIG. 3.

Since all of the constituent parts of the spectrum of FIG. 2 become in phase at time $t_0$, the pulse shown in FIG. 1 is formed, whereas in the case of the spectrum of FIG. 3 all constitutent parts of the spectrum can never become in phase at any moment. As a result, when the total spectral energy of FIG. 2 is equal to that of FIG. 3, a pulse having smaller peak power than the pulse of FIG. 1 is formed. Thus in order that the spectral energy of FIG. 2 may be equal to that of FIG. 3, the pulse must have a pulse width wider than that of FIG. 1. Referring to the spectrum of FIG. 3, let it be assumed that the phase of the part 11 has been changed to become the same as that of parts 12 and 13. Then all constituent parts of the spectrum of FIG. 3 will become in phase at time $t_0$. If the spectral energy of FIG. 3 equals that of FIG. 2, the peak power of the wave form constituting the spectrum of FIG. 3 becomes equal to the peak power of the pulse in FIG. 1. Even if the phase of part 11 is changed, the total energy of the spectrum of FIG. 3 remains unchanged. Therefore the peak power of the wave form of the spectrum of FIG. 3 will be increased and at the same time, the pulse width will become narrower.

As shown in FIG. 4, in transmission, a master oscillator 15 generates an electrical oscillation whose frequency is made equal to the center frequency of the intermediate frequency of the receiver section of the radar equipment. The oscillation is divided into two portions and one of the portions is applied to a phase shifter 16 and phase-shifted so as to have a leading phase shift of 90° with respect to the output of the master oscillator 15. The phase-shifted portion of the oscillation is sent to a balanced modulator 17 where the portion is modulated by another electrical oscillation which is generated by a subordinate oscillator 18 and which has a frequency or a modulation frequency equal to the frequency difference between the center frequency of the spectrum part 11 and that of the spectrum part 12, or $2/(3\tau)$ in the example being considered. Inasmuch as the modulator 17 is of balanced type, it will be understood that the modulated oscillation has a pair of side bands and the oscillation itself which may be considered the carrier is suppressed in the output of the modulator 17.

Let the oscillation voltage of master oscillator 15 and the modulating signal be expressed respectively by cos $2\pi f_0 t$ and $$\sin 2\pi \frac{2}{3\tau}t$$

Since the phase of the voltage of master oscillator 15 to the balanced modulator 17 is advanced by 90 degrees in the phase shifter 16, the oscillation voltage becomes sin $2\pi f_0 t$. At the balanced modulator 17, the output from subordinate oscillator 18. Since the output of the sub- the phase shifter 16 is modulated by the output of the ordinate oscillator 18 is $$\sin 2\pi \frac{2}{3\tau}t$$

the output of the balanced modulator 17 becomes the addition of two components $$\cos 2\pi\left(f_0+\frac{2}{3\tau}\right)t$$

and $$-\cos 2\pi\left(f_0-\frac{2}{3\tau}\right)$$

which are derived from the product of sin $2\pi f_0 t$ and $$\sin 2\pi \frac{2}{3\tau}t$$

Being a balanced modulator, no sin $2\pi f_0 t$ component will appear at output terminal of the balanced modulator 17. Instead, the output voltage to which a part of the output voltage of the master oscillator 15 is added directly will appear at the input side of the mixer 19. Thus three components $$-\cos 2\pi\left(f_0-\frac{2}{3\tau}\right)t, \cos 2\pi f_0 t$$

and $$\cos 2\pi\left(f_0+\frac{2}{3\tau}\right)t$$

will exist on the input side of mixer 19.

The reason why the component $$-\cos 2\pi\left(f_0-\frac{2}{3\tau}\right)t$$

alone differs 180 degrees in phase from the other two components is that the phase shifter 16 exists. In the absence of the shifter 16, the carrier wave entering into the balanced modulator 17 will become the same as the carrier wave applied to 19 directly from the master oscillator 15, resulting in amplitude modulation in the presence of a carrier wave.

Such a modulator circuit using a phase shifter is substantially the same in construction as that described in section "The Transmitting System" of "A Method of Reducing Disturbances in Radio Signaling by a System of Frequency Modulation" by Edwin H. Armstrong, Proceedings of I.R.E., May 1936. As shown in FIG. 1 in the treaties by E. H. Armstrong, the 90 degrees phase changing device is installed after the balanced modulator, but as will be evident from FIG. 3 as well as the description thereof the object of the phase changing device is to shift the phase of carrier by 90 degrees from each of the phases of the upper and lower sidebands. Therefore, despite the existence of the device between the master oscillator and the balanced modulator as shown in FIG. 3 of the subject patent specification, the effect of the Armstrong modulator circuit is not substantially different from the aforementioned modulator circuit.

In FIG. 5, the line spectrum 31 is the output of the master oscillator 15, i.e., sin $w_0 t$, and the line spectra 32 and 33 are the outputs of the balanced modulator 17, i.e., $\sin(w_c+w_p)t$ and $-\sin(w_c-w_p)t$, respectively, the dotted line 33 showing the fact that the phase of this component is reversed with respect to the phase of the components shown in solid lines.

The combined oscillation is then heterodyned at the mixer 19 with the output of a local oscillator 20 to produce a signal of transmitting frequency which is the sum of the frequencies of the oscillations generated by the master oscillator 15 and the local oscillator 20. This signal is amplified at a high-frequency amplifier 21 and also pulse-modulated thereat by a series of pulses of high level sent thereto from a pulse generator 22. The pulse generator 22 is triggered by the output of a frequency divider 23 which divides the frequency of the subordinate oscillator 18 into an integral submultiple thereof, so that the carrier-suppression modulation effected in the balanced modulator 17 and the pulse modulation effected in the amplifier-modulator 21 may have a predetermined phase relationship and the waveforms of the signal to be transmitted may be the same for all the pulses. As the result of this pulse modulation, the line spectra shown in FIG. 5 will spread as shown in FIG. 3. The pulse-modulated signal is fed to an antenna 24 through a transmitter-receiver device 25.

In reception, the echo signal from a target is fed from the antenna 24 to the transmitter-receiver device 25, and then to a mixer 26, where the amplified signal is heterodyned with the output of the local oscillator 20 and converted into an intermediate frequency signal. This signal is further amplified by an intermediate frequency amplifier 27 and is fed to a specific combination of circuit elements which is generally shown by 28 and which is to be later described with reference to FIG. 6. Although in the equipment shown the circuitry 28 is arranged in the intermediate frequency stage of the receiver section, it is to be noted that such may also be well disposed in the high frequency stage thereof. The output of this circuitry 28 is applied to a detector 29 and then to an indicator 30 whose time-axis sweep is controlled by the low level output of the pulse generator 22 with a view to synchronizing the indicator 30 with the pulse frequency, the low level output being derived as by means of a voltage divider connected across the above-mentioned high level output of the pulse generator 22.

Turning now to FIG. 6, the specific circuitry 28 comprises filters 34, 35, and 36 which have $2/(3\tau)$ bandwidth and center frequencies of $f_0-2/(3\tau)$, $f_0$, and $f_0+2/(3\tau)$, respectively, and a phase shifting circuit 37 which is connected in series with the filter 34 and which shifts the phase of the input wave by 180°. Let it be considered a case in which a signal having a frequency spectrum as shown in FIG. 3 is applied to an input terminal 38 of the circuit 28 from the intermediate frequency amplifier 27. Since the center frequency and pass bandwidth of filter 34 are respectively $f_0-2/(3\tau)$ and $2/(3\tau)$ as mentioned previously, it allows passage of the part 11 alone of the spectrum of FIG. 3. In like manner, a filter 35 having center frequency $f_0$ and pass bandwidth $2/(3\tau)$ allows passage of the part 12 alone of the spectrum of FIG. 3 and a filter 36 having center frequency $f_0+2/(3\tau)$ and pass bandwidth $2/(3\tau)$ allows passage of the part 13 alone. Because the output sides of filters 35 and 36 are connected in common without the intervention of phase shifters, the parts 12 and 13 of the spectrum are combined at an output terminal 39 of the circuit 28 with their initial phases preserved, whereas the part 11 of the spectrum, after passage through the filter 34, enters into phase shifter 37 to receive a phase shift of 180 degrees. Since the part 11 of the spectrum has been given a phase shift of 180 degrees with respect to the other parts 12 and 13 in case of transmission as mentioned previously, the phase relations of the parts 11 to 12 and 13 are such that the part 11 becomes in phase with parts 12 and 13 at some moment upon rendering a phase shift by the phase shifter 37. At this moment all of the constituent parts of the spectrum add up in phase to constitute a pulse of large peak power at the output terminal 39 in a similar manner as the spectrum of FIG. 2 constitutes the pulse of FIG. 1.

Although in the foregoings an embodiment of this invention has been described wherein the frequency spectrum of the transmitted pulse is divided into only three parts, the spectrum may be divided into an arbitrary number of parts. The more the spectrum is divided, the lower the peak power and the wider the transmitted pulses will become. Furthermore, although phase differences of 0° or 180° have been adopted for each part of the frequency spectrum, other combination of phase differences or relationships may also well be adopted for these spectrum parts.

This invention is based on the fact that a sharp narrow pulse is formed of oscillations having a wide frequency spectrum. In this invention, therefore, means is provided in the transmitter section of a radar equipment for successively or continuously transmitting electrical oscillations which are distributed over a wide frequency spectrum whose spectrum parts having such phase conditions that substantial parts of the spectrum parts may cancel out one another and may form either a wide and low peak-power pulses or a continuous wave as in the phase modulation and means is provided in the receiver section of the equipment for converting the phases of the spectrum parts so that all the spectrum parts may additively contribute to form discrete pulses of sharp narrow widths.

Among concrete methods for forming the above-mentioned transmitted wave are the method described above with reference to FIG. 4 wherein a balanced modulator and a phase shifter are used and another method wherein pulse modulation is effected after phase modulation, and still another method of separating a narrow pulse into a number of frequency spectrum parts by means of filters, phase-shifting some of the spectrum parts by means of phase shifters so as to give them particular phase relationships, and composing all the frequency spectrum parts.

It will be noted that in the embodiment described with reference to the drawings no reference has been made to the pulse repetition. Now referring to the pulse repetition, it will be understood that, in the case of a series of repeated pulses the continuous distribution of the frequency distribution will turn into a series of discrete line spectra spaced from one another by the frequency interval of the repetition frequency and that for every repetition the same phase relationships will hold between one another. It follows therefore that the above discussion need not be changed as far as the repetition period is sufficiently large. The transmitted wave may be a modulated continuous wave which is an extreme case where the repeated pulses are sufficiently wide and where line spectra will appear besides the line spectrum of the carrier frequency.

What we claim is:

1. A radar system comprising means for transmitting a modulated electromagnetic wave having such a frequency spectrum that all parts thereof cannot coincide in phase at any moment, means for receiving echoes from targets of said transmitted electromagnetic wave, an amplifier for said received waves and a circuit at the output of said amplifier consisting of filters connected in parallel and a phase shifter connected in tandem to at least one of said filters to change phases of the parts of the frequency spectrum which have passed through said filters so that all parts of the spectrum may coincide in phase at some moment to form output pulses narrower in width than input signals when the outputs of these phase shifters are combined.

2. A radar system comprising means for transmitting a modulated electromagnetic wave having such a frequency spectrum that all parts thereof cannot coincide in phase at any moment, means for receiving echoes from targets of said transmitted electromagnetic wave, means connected to said receiving means for converting said received signal to an intermediate frequency signal, an intermediate frequency amplifier connected to said intermediate frequency converter, and a circuit at the output of said amplifier consisting of filters connected in parallel and a phase shifter connected in tandem to at least one of said filters to change phases of the parts of the frequency spectrum which have passed through said filters so that all parts of the spectrum may coincide in phase at some moment to form output pulses narrower in width than input signals when the outputs of these phase shifters are combined.

3. A radar transmitting system comprising a source of a first wave energy of a first given frequency $f_0$, another source of a second wave energy of a second given frequency $f_1$ which is smaller than said first frequency, means for producing from these wave energies third wave energies of frequencies $f_0-f_1$ and $f_0+f_1$, means for combining said first wave energy and said produced third wave energies to provide a complex wave containing third wave energies of frequencies $f_0-f_1$, $f_0$, and $f_0+f_1$ as components, a pulse generator for producing pulses of a repetition rate equal to a sub-multiple of said second frequency $f_1$, means for amplitude-modulating said complex wave with said pulses at times when at least one of said components has an instantaneous phase differing from the other components, and means for transmitting said modulated signals.

4. A radar receiver for use with the waves from the transmitter of claim 3, comprising means for receiving echoes of the transmitted signals, filters tuned to select the individual frequency components connected in parallel to the output of the receiver means, phase shifters in tandem with the filter for the component differing from the other components to shift it into phase with said other components, and means to combine the energy from said filters and phase shifters.

References Cited in the file of this patent

UNITED STATES PATENTS

| | | |
|---|---|---|
| 2,624,876 | Dicke | Jan. 6, 1953 |
| 2,678,997 | Darlington | May 18, 1954 |
| 2,753,448 | Rines | July 3, 1956 |